(12) United States Patent
Murray

(10) Patent No.: US 9,447,891 B2
(45) Date of Patent: Sep. 20, 2016

(54) DUAL STAGE POPPET

(71) Applicant: Keith A. Murray, Yorba Linda, CA (US)

(72) Inventor: Keith A. Murray, Yorba Linda, CA (US)

(73) Assignee: EATON CORPORATION, Cleveland, OH (US)

( * ) Notice: Subject to any disclaimer, the term of this patent is extended or adjusted under 35 U.S.C. 154(b) by 116 days.

(21) Appl. No.: 14/375,919

(22) PCT Filed: Jan. 28, 2013

(86) PCT No.: PCT/US2013/023390
§ 371 (c)(1),
(2) Date: Jul. 31, 2014

(87) PCT Pub. No.: WO2013/116137
PCT Pub. Date: Aug. 8, 2013

(65) Prior Publication Data
US 2015/0027549 A1     Jan. 29, 2015

Related U.S. Application Data

(60) Provisional application No. 61/593,534, filed on Feb. 1, 2012.

(51) Int. Cl.
*F16K 15/02* (2006.01)
*F16K 39/02* (2006.01)
*F16L 37/32* (2006.01)

(52) U.S. Cl.
CPC ........... *F16K 15/026* (2013.01); *F16K 39/024* (2013.01); *F16L 37/32* (2013.01); *Y10T 137/0318* (2015.04); *Y10T 137/7867* (2015.04)

(58) Field of Classification Search
CPC .................. Y10T 137/7838; Y10T 137/7867; F16K 39/024
USPC ........................... 137/512, 614.04; 251/149.1
See application file for complete search history.

(56) References Cited

U.S. PATENT DOCUMENTS

| | | |
|---|---|---|
| 3,111,141 A | 11/1963 | Hughes |
| 3,851,852 A | 12/1974 | Blanchard et al. |
| 3,961,645 A | 6/1976 | Kagan |
| 6,095,190 A | 8/2000 | Wilcox et al. |
| 6,213,570 B1 | 4/2001 | Gegalski et al. |
| 6,736,164 B2* | 5/2004 | Pozgainer ........ B60K 15/03519 137/588 |

OTHER PUBLICATIONS

Written Opinion issued for PCT/US2013/023390 mailed on May 8, 2013.
International Search Report issued for PCT/US2013/023390 mailed on May 8, 2013.

* cited by examiner

*Primary Examiner* — Kevin Lee
*Assistant Examiner* — P. Macade Nichols
(74) *Attorney, Agent, or Firm* — Benesch Friedlander Coplan & Aronoff LLP

(57) ABSTRACT

A valve includes an interior portion and a nozzle passage. The valve further includes a poppet having a first stage portion and a second stage portion. The poppet has a closed position in which the first stage portion and the second stage portion seal the interior portion of the valve from the nozzle passage. The poppet also has a partially open position, in which the first stage portion of the poppet is spaced from the second stage portion of the poppet, and defines a first fluid passage between the interior portion of the valve and the nozzle passage. Additionally, the poppet has a fully open position, in which the second stage portion of the poppet is spaced from the nozzle passage of the valve, and defines a second fluid passage between the interior portion of the valve and the nozzle passage.

19 Claims, 4 Drawing Sheets

DUAL STAGE POPPET

This application claims priority to PCT Application No. PCT/US13/23390, entitled DUAL STAGE POPPET, filed Jan. 28, 2013; which claims priority to U.S. Provisional Patent Application No. 61/593,534, entitled DUAL STAGE POPPET, filed on Feb. 1, 2012.

FIELD OF INVENTION

The present disclosure relates to a valve having a poppet. More particularly, the present disclosure relates to a valve having a poppet that opens in multiple stages.

BACKGROUND

Poppet valves are characterized by having a movable element (the poppet) that is used to direct the flow of a fluid through a valve body. A poppet valve may be used as a check valve in a system that requires flow of a fluid in a single direction. Exemplary systems that may use a poppet valve as a check valve include, without limitation, air compressors and controllers, water treatment facilities, utility facilities, and vehicle fuel systems, such as aircraft fuel systems.

In the operation of an aircraft fuel system, operational fluid that is supplied to the controls may vary in temperature and pressure. To supply fluid to the system, a nozzle engages the poppet and moves it to an open position, thereby opening a fluid passage. Where the internal fluid pressure is greater, the nozzle must exert a greater force to move the poppet to an open position.

SUMMARY OF THE INVENTION

A valve includes an interior portion and a nozzle passage. The valve further includes a poppet having a first stage portion and a second stage portion. The poppet has a closed position in which the first stage portion and the second stage portion seal the interior portion of the valve from the nozzle passage. The poppet also has a partially open position, in which the first stage portion of the poppet is spaced from the second stage portion of the poppet, and defines a first fluid passage between the interior portion of the valve and the nozzle passage. Additionally, the poppet has a fully open position, in which the second stage portion of the poppet is spaced from the nozzle passage of the valve, and defines a second fluid passage between the interior portion of the valve and the nozzle passage.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
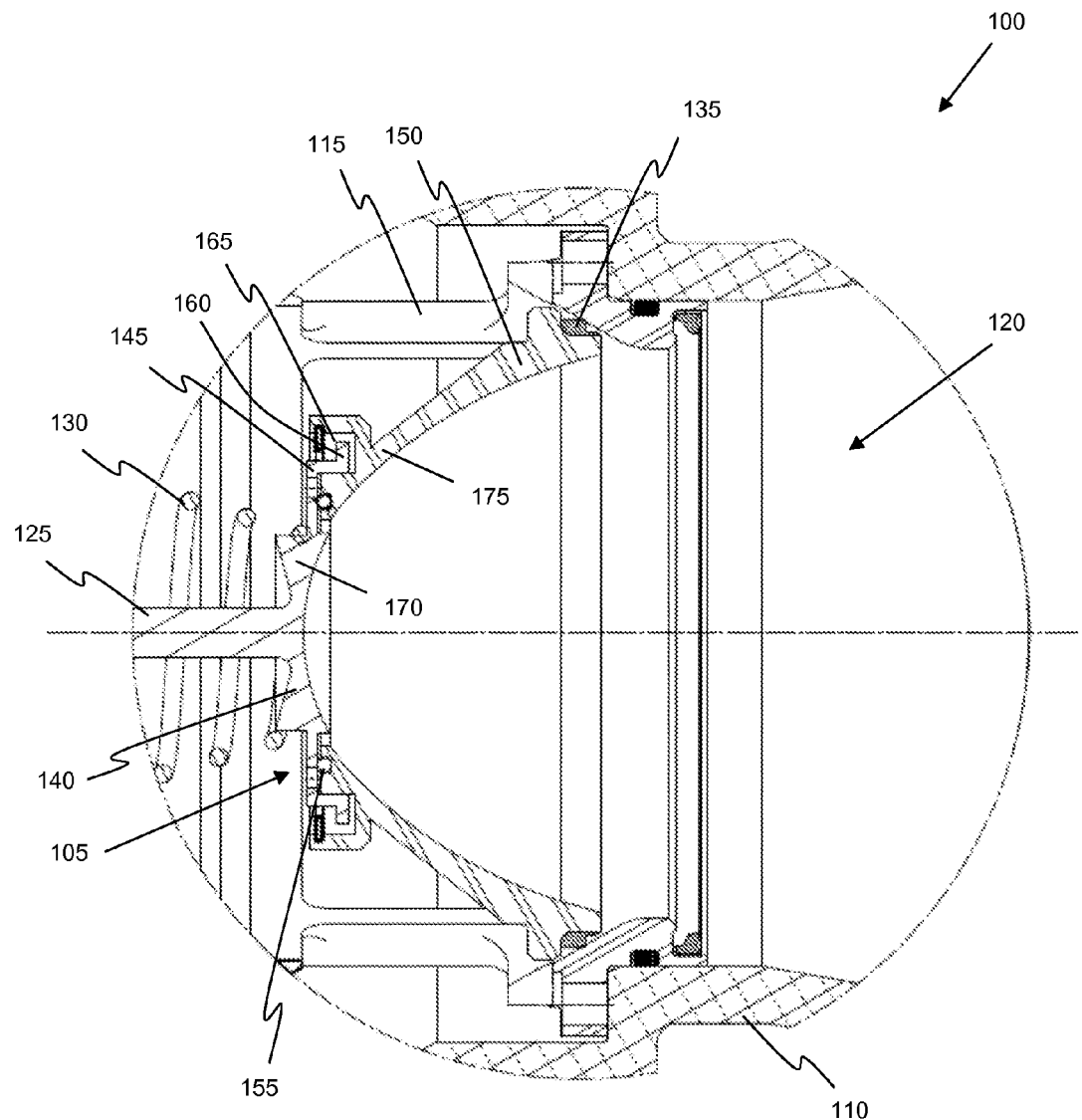
FIG. 1 is a cross-section of one embodiment of a poppet valve 100.

FIG. 1 illustrates a cross-section of one embodiment of a poppet valve 100. The poppet valve 100 includes a poppet 105 disposed in a valve body 110 and poppet guide cage 115 that defines a nozzle passage 120. The poppet 105 includes a shaft 125 and a spring 130 that biases the poppet 105 in a closed position against a seal 135. The seal 135 may be constructed of an elastomeric material, such as, without limitation, Nitrile, Fluorosilicone, Fluorocarbon, nylons, polyamides, or fluorocarbons, or other suitable elastomeric material. Alternatively, the seal may be constructed of organic materials such as, without limitation, felt or leather. In another embodiment, the seal may be constructed of metals, including, without limitation, aluminum or corrosion resistant steel.

The poppet 105 further includes a first stage portion 140 that has a flange 145 extending therefrom. The poppet 105 also includes a second stage portion 150. When the poppet 105 is in the closed position, the flange 145 and the poppet guide cage 115 abut the second stage portion 150 in a sealed manner. As shown in FIG. 1, an annular seal 155 may be disposed in a groove in the second stage portion 150. When the poppet 105 is in the closed position, the annular seal 155 abuts the flange 145 of the first stage portion 150, thereby closing a passage through which fluid may flow. The annular seal 155 may be constructed of an elastomeric material, such as, without limitation, Nitrile, Fluorosilicone, Fluorocarbon, nylons, polyamides, or fluorocarbons, or other elastomeric material. Alternatively, the annular seal may be constructed of organic materials such as, without limitation, felt or leather. In another embodiment, the annular seal may be constructed of metals, including, without limitation, aluminum or corrosion resistant steel.

In an alternative embodiment (not shown), a second annular seal may be disposed in a groove in the first stage portion. In another alternative embodiment (not shown), an annular seal is not employed in either the first stage portion or the second stage portion.

The flange 145 of the first stage portion 140 includes a ledge 160. When the poppet 105 is in the closed position, the ledge 160 is received in a recess 165 in the second stage portion 150.

As further shown in FIG. 1, when the poppet 105 is in the closed position, the second stage portion 150 abuts against the seal 135 in a sealed manner. Because the first stage portion 140 abuts against the second stage portion 150 in a sealed manner, and the second stage portion 150 abuts against the poppet guide cage 115 in a sealed manner, the poppet 105 seals off fluid communication between the nozzle passage 120 and the interior of the poppet valve 100.

The first stage portion 140 of the poppet 105 has a first curved surface 170. The second stage portion 150 of the poppet 105 has a second curved surface 175. When the poppet 105 is in the closed position, the first curved surface 170 of the first stage portion 140 and the second curved surface 175 of the second stage portion 150 form a discontinuous curved surface. In an alternative embodiment (not shown), the first and second stage portions of the poppet form a continuous curved surface when the poppet is in the closed position.

Figure 2:
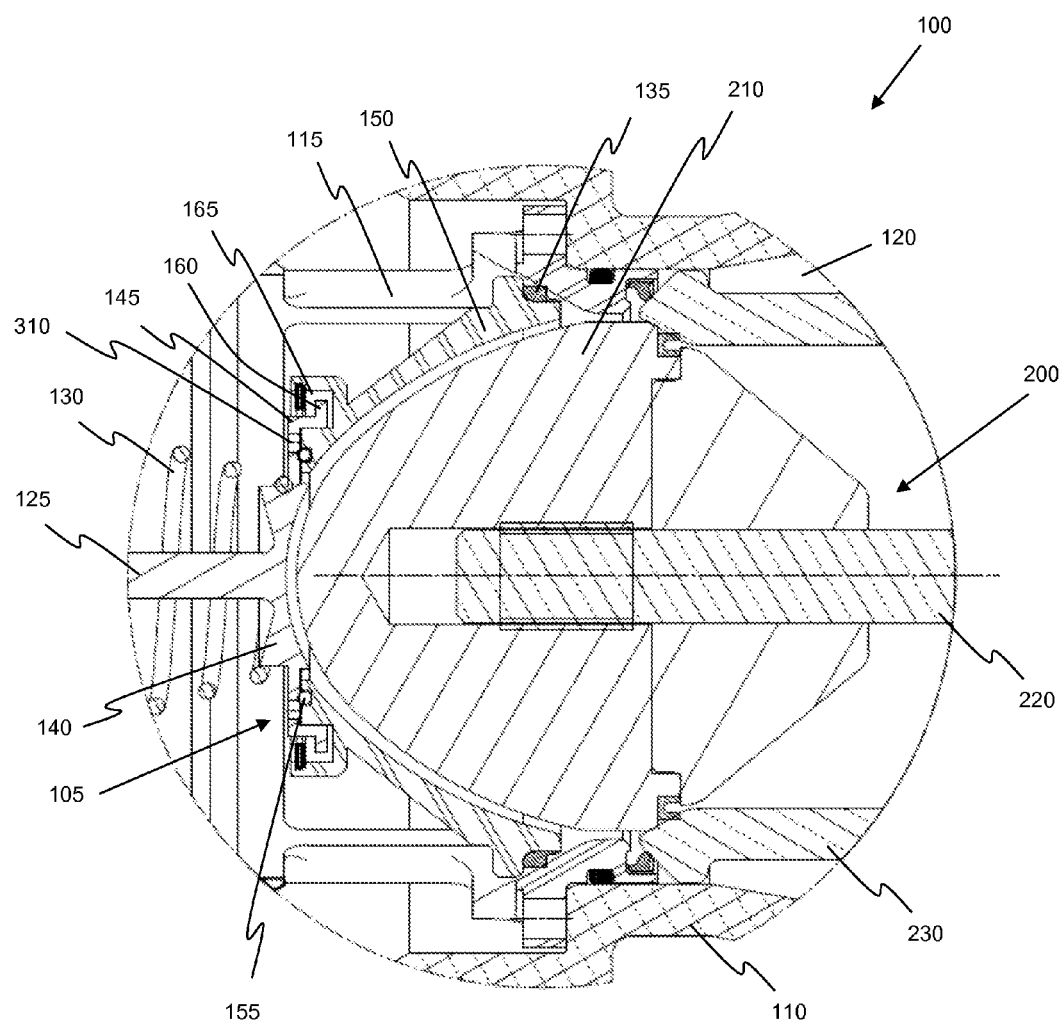
FIG. 2 is a cross-section of the poppet valve 100 with one embodiment of a nozzle 200 in a first position.

FIG. 2 illustrates a cross-section of the poppet valve 100 with one embodiment of a nozzle 200 disposed in the nozzle passage 120 in a first position. The nozzle 200 includes a head 210 disposed on a shaft 220 and surrounded by a sleeve 230. In the first position, the nozzle 200 is in the nozzle passage 120, and its sleeve 230 is in contact with the seal 135. However, the nozzle head 210 is not in contact with the poppet 105.

Figure 3:
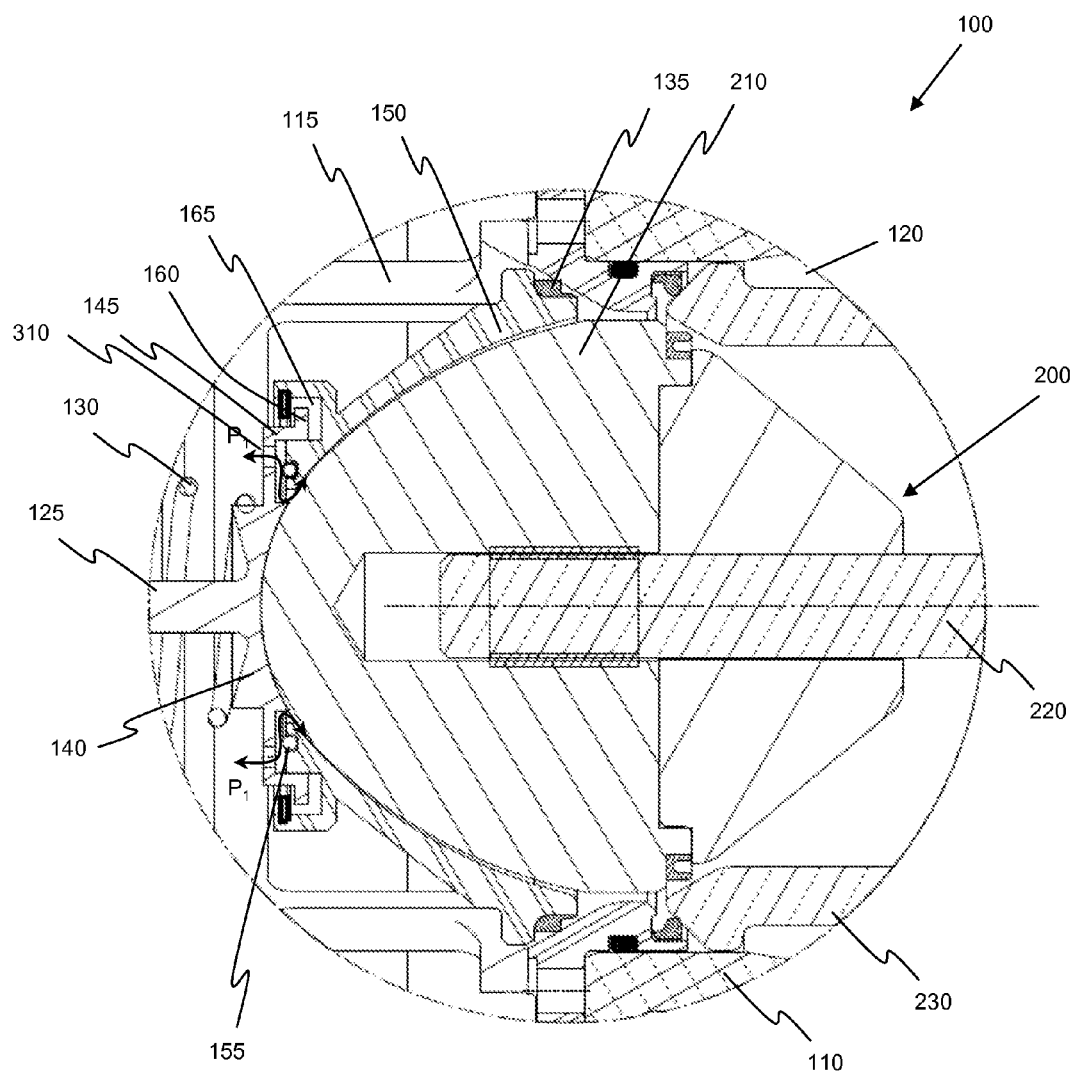
FIG. 3 is a cross-section of the poppet valve 100 with the nozzle 200 in a second position.

FIG. 3 illustrates a cross-section of the poppet valve 100 with the nozzle 200 disposed in the nozzle passage 120 in a second position. In the second position, the shaft 220 extends and moves the nozzle head 210 away from the sleeve 230. The nozzle head 210 pushes the first stage portion 140 of the poppet 105 against the spring 130 and away from the second stage portion 150 of the poppet 105.

When the first stage portion 140 of the poppet 105 is separated from the second stage portion 150 of the poppet 105, a first fluid passage is opened. The flange 145 of the first stage portion 140 includes apertures 310 that are aligned with the first fluid passage, thereby allowing fluid to flow between the interior of the poppet valve 100 and the nozzle passage 120.

The flow of fluid is illustrated by first arrows $P_1$ in FIG. 3. Because fluid flows through the first fluid passage, the poppet 105 may be described as partially open. The flow of fluid reduces any pressure differential between the interior of the valve 100 and the nozzle passage 120.

Figure 4:
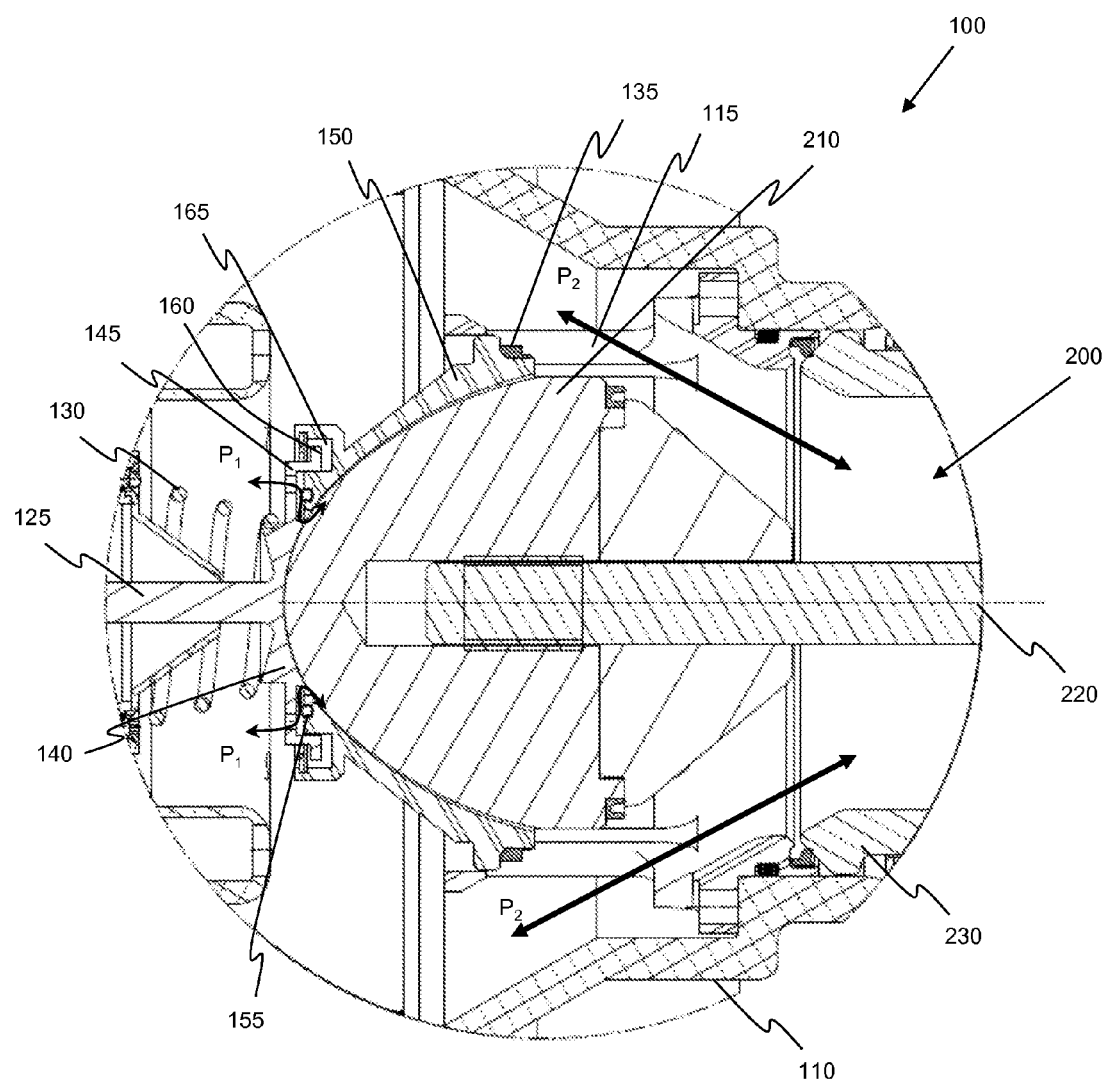
FIG. 4 is a cross-section of the poppet valve 100 with the nozzle 200 in third position.

FIG. 4 illustrates a cross-section of the poppet valve 100 with the nozzle 200 disposed in the nozzle passage 120 in a fully engaged position. In this position, the shaft 220 extends and moves the nozzle head 210 further away from the sleeve 230. The nozzle head 210 continues to push both the first stage portion 140 and also fully engages the second stage portion 150 of the poppet 105.

When the nozzle 200 is in the fully engaged position, the poppet 105 is in a fully open position. The first fluid passage remains open, and a second fluid passage is also opened. The second fluid passage is indicated by second arrows $P_2$. The second fluid passage is larger than the first fluid passage, and allows higher fluid flows from the poppet valve 100 to the nozzle 200.

Opening the first fluid passage even briefly before moving the second stage portion may greatly reduce the force required by the nozzle. In one embodiment, the fluid pressure in the interior of the poppet valve is at 10 psig. With a single stage poppet, a nozzle must apply approximately 80 pounds of force to move the poppet to the fully open position. With a two stage poppet, similar to the poppet 100 described herein, the nozzle must apply only about 15 pounds of force to move the poppet to the fully open position.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A valve comprising:
   an interior portion;
   a nozzle passage; and
   a poppet having a first stage portion and a second stage portion, wherein the first stage portion comprises a flange having an aperture there through,
      wherein the poppet has a closed position in which the first stage portion and the second stage portion seal the interior portion of the valve from the nozzle passage,
      wherein the poppet has a partially open position, wherein the first stage portion of the poppet is capable of being spaced from the second stage portion of the poppet, and when the poppet is in the partially open position defines a first fluid passage between the interior portion of the valve and the nozzle passage, and
      wherein the poppet has a fully open position, wherein the second stage portion of the poppet is capable of being spaced from the nozzle passage of the valve, and when the poppet is in the fully open position defines a second fluid passage between the interior portion of the valve and the nozzle passage.

2. The valve of claim 1, wherein the first stage portion comprises a first curved surface.

3. The valve of claim 2, wherein the second stage portion comprises a second curved surface.

4. The valve of claim 3, wherein the first curved surface and the second curved surface define a discontinuous curved surface of the poppet.

5. The valve of claim 3, wherein the first curved surface and the second curved surface define a continuous curved surface of the poppet.

6. The valve of claim 3, wherein the second stage portion comprises a recess capable of receiving an annular seal.

7. The valve of claim 2, wherein the first stage portion comprises a groove capable of receiving an annular seal.

8. The value of claim 1, wherein the poppet further comprises a shaft and a spring, wherein the spring is capable of being engaged by the first stage portion of the poppet.

9. The value of claim 1, further comprising a poppet guide cage that defines the nozzle passage.

10. A method of directing flow of a fluid through a valve body, comprising:
    providing a nozzle;
    providing a valve comprising an interior portion, a nozzle passage, and a poppet having a first stage portion and a second stage portion, wherein the poppet is capable of being disposed in a closed position, in which the first stage portion and the second stage portion seal the interior portion of the valve from the nozzle passage, a partially open position, and a fully open position; and moving the poppet from the closed position to the partially open position by advancing the nozzle through the nozzle passage so that the first stage portion of the poppet is spaced from the second stage portion of the poppet and a first fluid passage is defined between the interior portion of the valve and the nozzle passage.

11. The method of claim 10, further comprising moving the poppet from the partially open position to the fully open position by further advancing the nozzle through the nozzle passage so that the second stage portion of the poppet is spaced from the nozzle passage of the valve and a second fluid passage is defined between the interior portion of the valve and the nozzle passage.

12. The valve of claim 11, wherein the first stage portion comprises a first curved surface and a flange, the flange having an aperture there through.

13. The valve of claim 12, wherein the second stage portion comprises a second curved surface.

14. The valve of claim 13, wherein the first curved surface and the second curved surface define a discontinuous curved surface of the poppet.

15. The valve of claim 13, wherein the first curved surface and the second curved surface define a continuous curved surface of the poppet.

16. The valve of claim 13, wherein the second stage portion comprises a recess capable of receiving an annular seal.

17. The valve of claim 12, wherein the first stage portion comprises a groove capable of receiving an annular seal.

18. The value of claim 11, wherein the poppet further comprises a shaft and a spring, wherein the spring is capable of being engaged by the first stage portion of the poppet.

19. The value of claim 11, further comprising a poppet guide cage that defines the nozzle passage.

* * * * *